United States Patent
Sehr et al.

(10) Patent No.: US 9,372,704 B2
(45) Date of Patent: Jun. 21, 2016

(54) VIRTUAL ENVIRONMENT HAVING HARVARD ARCHITECTURE

(71) Applicant: Google Inc., Mountain View, CA (US)

(72) Inventors: David C. Sehr, Cupertino, CA (US); J. Bradley Chen, Los Gatos, CA (US); Bennet S. Yee, Mountain View, CA (US)

(73) Assignee: Google Inc., Mountain View, CA (US)

( * ) Notice: Subject to any disclaimer, the term of this patent is extended or adjusted under 35 U.S.C. 154(b) by 149 days.

(21) Appl. No.: 14/141,906

(22) Filed: Dec. 27, 2013

(65) Prior Publication Data

US 2014/0282534 A1    Sep. 18, 2014

Related U.S. Application Data

(60) Provisional application No. 61/783,338, filed on Mar. 14, 2013.

(51) Int. Cl.
| | |
|---|---|
| *G06F 21/00* | (2013.01) |
| *G06F 9/455* | (2006.01) |
| *G06F 21/53* | (2013.01) |

(52) U.S. Cl.
CPC ............ *G06F 9/455* (2013.01); *G06F 9/45558* (2013.01); *G06F 21/53* (2013.01); *G06F 2009/45583* (2013.01)

(58) Field of Classification Search
CPC ..... G06F 9/455; G06F 21/53; G06F 9/45558; G06F 2009/45583
See application file for complete search history.

(56) References Cited

U.S. PATENT DOCUMENTS

| | | | |
|---|---|---|---|
| 5,706,466 A | 1/1998 | Dockser | |
| 6,148,373 A | 11/2000 | Hsu et al. | |
| 6,698,014 B1 * | 2/2004 | Rechter | ......................... 717/137 |
| 7,370,160 B2 | 5/2008 | Neiger et al. | |

(Continued)

FOREIGN PATENT DOCUMENTS

| | | |
|---|---|---|
| EP | 2 498 183 | 9/2012 |
| WO | 91/06908 | 5/1991 |
| WO | 2012/127453 | 9/2012 |

OTHER PUBLICATIONS

Reuben Thomas: "Mite: a fast and flexible virtual machine," Aug. 15, 1998, pp. 1-7, Computer Laboratory, University of Cambridge Retrieved from the Internet: URL:http://www.complang.tuwien.ac.at/anton/euroforth/ef98/thomas98.pdf [retrieved on May 14, 2014] abstract.

(Continued)

*Primary Examiner* — Chau Le
*Assistant Examiner* — Muhammad Chaudhry
(74) *Attorney, Agent, or Firm* — Fish & Richardson P.C.

(57) ABSTRACT

Methods, systems, and apparatus, including computer programs encoded on computer storage media, relating to software execution. One of the methods includes executing, on a computer including a single memory for storing data and instructions, a virtual environment including a data memory and an instruction memory, the instruction memory configured to be unreadable by instructions stored in the instruction memory; receiving, at the virtual environment, a software module comprising multiple instructions; and performing validation of the software module including: identifying, in the software module one or more calls to the single memory; and verifying that the one or more calls to the single memory are in the data memory.

17 Claims, 6 Drawing Sheets

(56) References Cited

U.S. PATENT DOCUMENTS

| | | | |
|---|---|---|---|
| 7,380,276 B2 | 5/2008 | Saha et al. | |
| 8,353,031 B1 | 1/2013 | Rajan et al. | |
| 2003/0115584 A1* | 6/2003 | Fahs et al. | 717/158 |
| 2009/0282477 A1 | 11/2009 | Chen et al. | |
| 2012/0042145 A1* | 2/2012 | Sehr et al. | 711/163 |
| 2012/0166705 A1 | 6/2012 | Dai et al. | |
| 2013/0055256 A1 | 2/2013 | Banga et al. | |
| 2013/0097356 A1* | 4/2013 | Dang et al. | 711/6 |
| 2015/0113640 A1* | 4/2015 | Krten et al. | 726/22 |

OTHER PUBLICATIONS

International Search Report and Written Opinion in International Application No. PCT/US2014/016373, mailed May 23, 2014, 11 pages.

'Wikipedia' [online]. "Harvard architecture," Jun. 17, 2014 [retrieved on Jun. 20, 2014]. Retrieved from the internet: URL <http://en.wikipedia.org/wiki/Harvard_architecture>, 4 pages.

"Harvard architecture," Princeton.edu [online], Sep. 5, 2013 [retrieved on Jun. 23, 2014]. Retrieved from the internet: URL<http://www.princeton.edu/~achaney/tmve/wiki100k/docs/Harvard_architecture.html>, 5 pages.

'Digital Design and Programming' [online]. "Difference between Harvard and Von Neumann computer architectures," Sep. 6, 2010 [retrieved on Jun. 23, 2014]. Retrieved from the internet: URL<http://v-codes.blogspot.com/2010/09/difference-between-harward-and-von.html>, 3 pages.

Lu, CSE, Slideshow Presentation, [retrieved on Jun. 23, 2013]. Retrieved from the internet: URL<http://www.cse.wustl.edu/~lu/cse467s/slides/dsp.pdf/>, 7 pages.

International Preliminary Report on Patentability in International Application No. PCT/US2014/016373, mailed Sep. 24, 2015, 7 pages.

* cited by examiner

VIRTUAL ENVIRONMENT HAVING HARVARD ARCHITECTURE

CROSS-REFERENCE TO RELATED APPLICATION

This application claims the benefit under 35 U.S.C. §119 (e) of the filing date of U.S. Provisional Application Ser. No. 61/783,338, filed Mar. 14, 2013. The contents of the prior application are incorporated herein by reference in their entirety.

BACKGROUND

This instant specification relates to software execution.

A computer sandbox or sandbox environment is a mechanism often used for separating running programs from each other and/or the rest of the computing environment. A conventional sandbox environment may limit an impact of a running program on other programs, data stored by a computer system, or the computer system itself. Some sandbox environments are components of larger computer programs and may be used, for example, to contain plugins or scripted documents. Other sandboxes may be stand-alone or operating system-wide.

SUMMARY

A computer system with a von Neumann style architecture can host a virtual environment with a Harvard style architecture. In particular, a computer with a single type of memory can host a virtual environment that has a data memory and a separate instruction memory. Software modules that are stored in the instruction memory of the virtual environment may be run in the virtual environment. The instruction memory is configured such that an attempt by the module to access the instruction memory may be prevented while attempts to read the data memory by module may be permitted. By configuring the virtual environment to have the Harvard architecture, any suitable type of arbitrary untrusted module may be run in the virtual environment without exposing the memory layout of the virtual computer or computer system.

In general, one innovative aspect of the subject matter described in this specification can be embodied in methods that include the actions of executing, on a computer that includes a single memory for storing data and instructions, a virtual environment, the virtual environment includes a data memory and an instruction memory, the instruction memory configured to be unreadable by instructions stored in the instruction memory; receiving, at the virtual environment, a software module that includes multiple instructions; and performing validation of the software module including: identifying, in the software module one or more calls to the single memory; and verifying that the one or more calls to the single memory are in the data memory. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The computer conforms to a von Neumann style architecture and wherein the virtual environment conforms to a Harvard style architecture. Identifying in the software module one or more calls to the single memory includes identifying every call to the single memory; and wherein verifying that the one or more calls to the single memory are in the data memory comprises verifying that every call to the single memory is in the data memory replacing the one or more calls to the single memory with one or more calls to the data memory includes replacing every call to the single memory with a call to the data memory. The method including loading, in response to validating the software module, the software module into the instruction memory; and running the software module in the virtual environment. The method including converting, after receiving the software module and before examining the software module, the software module into a second representation of the software module; and wherein examining the software module to determine that one of the software module's instructions is configured to attempt to read the single memory includes examining the second representation of the software module to determine that one of the software module's instructions is configured to attempt to read the single memory. The instruction memory is addressed with memory addresses and corresponding abstract addresses; and wherein replacing the one or more calls to the single memory with one or more calls to the data memory includes replacing address of the single memory with abstract addresses of the data memory. The abstract addresses are randomized resulting in an obfuscation of the length of code stored in the instruction memory.

The systems and techniques described here may provide one or more of the following advantages. By addressing instruction memory and data memory differently, attempts to access instruction memory may be easily identified and changed. By preventing access to instruction memory, the memory layout of a computer or virtual environment may be hidden, increasing the security of both the system running a software module as well as other systems with similar virtual environments.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

Figure 1:
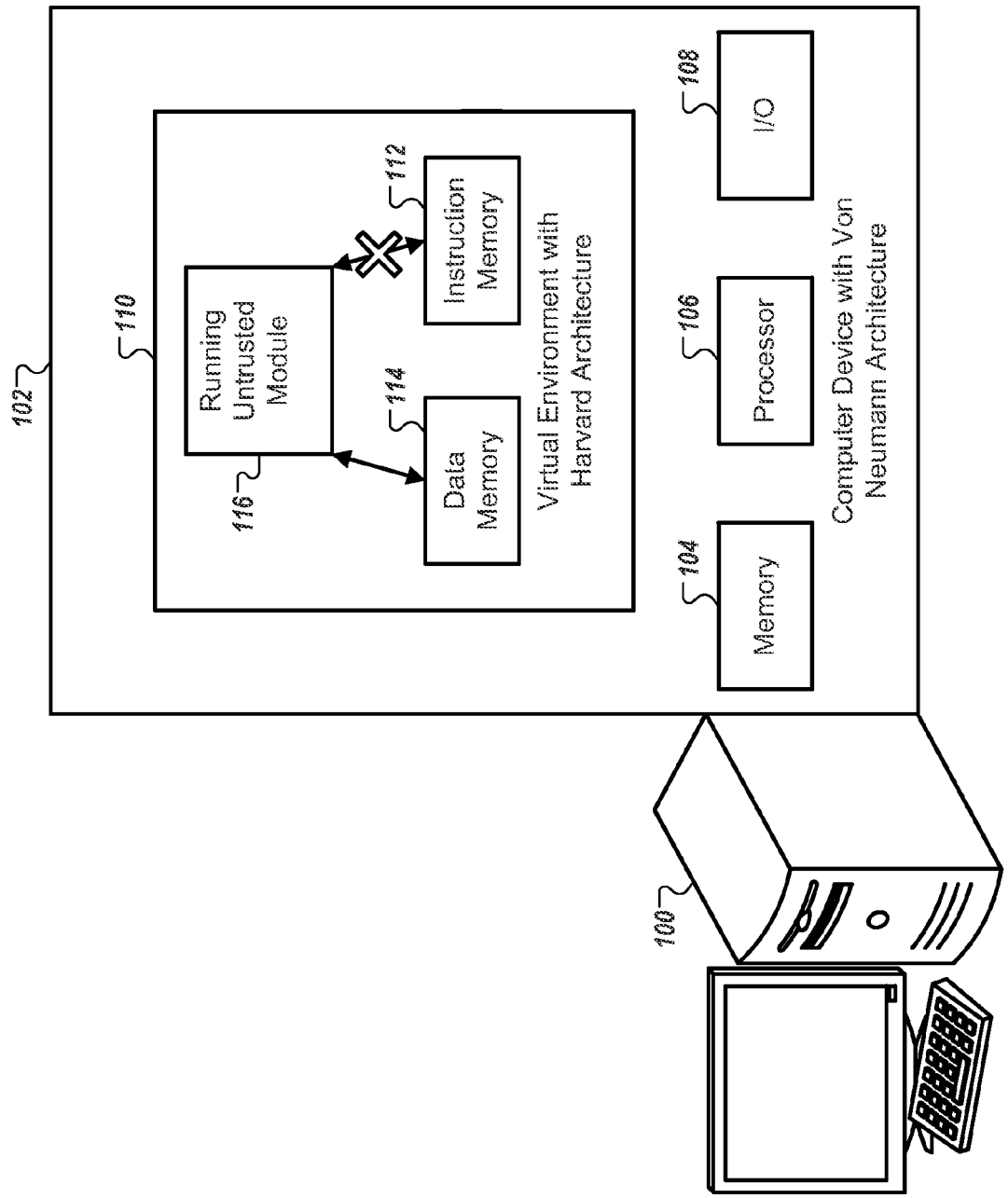
FIG. 1 is a block diagram of an example system in which a von Neumann computer hosts a Harvard virtual environment.

A physical computer, which may have more than one hardware memory modules, may be configured to expose its memory to software as a single unit of memory or with all memory being of broadly the same type. This is one feature of the von Neumann architecture. Another architecture, called the Harvard architecture, can expose two different types of memory. The first type of memory is called instruction memory. The instruction memory can hold the instruction of software run by the Harvard architecture computer. The second type of memory is called data memory. The data memory can hold data written and read by the software in the instruction memory. In the Harvard architecture, software stored in the instruction memory may not access the instruction memory, and the contents of the data memory may not be executed. Other types of hardware architectures exist. For example, the pseudo-Harvard or modified Harvard architecture is an architecture in which the instructions stored in the instruction memory may or may not be permitted to access the instruction memory, perhaps depending on the setting of a parameter in the computer.

A physical computer with the von Neumann style architecture can instantiate and/or host a virtual environment that has a Harvard style architecture. A von Neumann style architecture can include a computer that meets all of the requirements of the von Neuman architecture, or that meets a relaxed or modified set of requirements. For convenience, this specification generally refers to the von Neumann architecture, but any suitable von Neuman style architecture as describe above may be used. Similarly, for convenience the Harvard architecture is used in this specification, but any suitable Harvard style architecture having a distinct data memory and an instruction memory may be used.

For example, a computer device of an end user may have the von Neumann architecture. The computer device may start up a web-browser application that includes a security sandbox environment for running untrusted software modules. The sandbox environment may have a Harvard architecture in which the untrusted module is stored in instruction memory and data used by the untrusted module is stored in data memory. The running untrusted module may be prevented from accessing instruction memory. As a result, this may increase the security of the end user's computer by preventing the untrusted module from discovering information about the memory layout of the sandbox environment. Discovery of information about memory layout, even absent other malicious activity, may present a security risk to the users of the sandbox environment. For example, even if a malicious untrusted software module only learns of the memory layout and does not use that information in an attack against that particular computer, this information may be reported and aggregated for use in a future attack.

In some cases, the use of a virtual Harvard architecture environment hosted on a computer with a von Neuman architecture computer can provide a number of security features. For example, the use of the Harvard architecture environment can prevent untrusted code itself from reading its own instructions. In some scenarios, an attacker may create a module designed to introduce a return-oriented programming (ROP) attack. ROP programming is generally, a technique of chaining together short instruction sequences already present in a program's address, each of which ends in a 'return' instruction, without injecting any code into the program. ROP attacks are often able to bypass security measure that screen for malicious code because the code used in an ROP attack is part of a non-malicious module. The Harvard architecture environment can prevent, or make difficult, a determination that code is useable as a tool to automatically discover ROP sequences, sometimes called ROP gadget.

Additionally, the Harvard architecture virtual environment may use abstract addresses to prevent untrusted code from learning memory locations of generated translated code. If the abstract addresses do not have any correspondence with actual instruction memory addresses, an attacker may be prevented from using the values of the abstract address to make guesses about the length of generated code. Knowledge about the length of the generated code can reveal information about the degree of, for example, optimization performed or where it is likely that a useable ROP sequence might occur.

Two types of ROP attacks on the virtual environment can occur. The Harvard style architecture described in this specification can be used to prevent or hinder these types of attacks.

In a first type of attack, an attacker controls an untrusted module which is, possibly after translation, validated and loaded into a virtual environment. The attacker can attempt to include code sequences that may be useful as ROP gadgets, for example under a de-registered instruction decode scenario.

In a second type of attack, the attacker might not directly control the software module, but may be able to supply data that is consumed by the software module. For example, the software module may be a document viewer, and the attacker may be able to supply a document to be viewed. If the document viewer has bugs, the attacker may be able to gain control of the document viewer without being able to control the external embedding environment. In such an attack, the document viewer may have the ability to make requests in the browser environment with the same privileges as the domain from which the containing page is loaded. This may, for example, expose user data including e.g., browser cookies. The use of the Harvard style architecture can prevent an attacker from knowing where ROP gadgets are located, forcing the attacker to try to guess at the location, which may make the attack less likely to succeed and easier to detect.

FIG. 1 is a block diagram of an example physical computer 100 having the von Neumann architecture hosting a virtual environment 102 having the Harvard architecture. The physical computer 100 may be any sort of appropriate von Neuman computer, including but not limited to a desktop computer, server system, distributed or multi computer, telephone, tablet computer, or embedded system. Generally speaking, the physical computer 100 can include a memory 104, a processor 106, and an input/output module 108 as described by the von Neumann architecture. The physical computer 100 can also include software e.g., an operating system and/or installed applications.

The software of the physical computer 100 can create and host one or more virtual environments 110. Example virtual environment include, but are not limited to, interpreted language virtual machines, security sandboxes, virtual machines, and/or test environments. The virtual environment 110 contains virtual hardware components that correlate to or mimic real hardware components found in physical computers. For example, the virtual environment 110 can include an instruction memory 112 and a data memory 114 for storing software instructions and data, respectively. Depending on the configurations and settings of the virtual environment 110, the instruction memory 112 and data memory 114 may attempt to mimic similar hardware-based memory, or they may have limitations or difference from hardware-based memory that would make it apparent that they are software constructs in the virtual environment 110. The instruction memory and data memory 114 may be used in the virtual environment 110 for different purposes, unlike, for example, the memory 104 which may be configured to be used for any sort of memory use in the physical computer 100.

In some implementations, instructions of an untrusted module may be stored in the instruction memory. The untrusted module may be run, for example the virtual environment may interpret instructions of the untrusted module, to instantiate a running untrusted module 116. The virtual environment may permit the running untrusted module 116 to access the data memory 114, for example to store and later read data generated while running. The virtual environment may also deny permission to the running untrusted module 116 to access the instruction memory 112.

As a result of the configuration of the virtual environment 110, a number of security features may be realized. For example, since the running untrusted module may never be permitted to access instruction memory 112, validation of the instructions of the untrusted module may be simplified compared to other architectures. For example, in a von Neuman computer in which a single memory is used for both data and instructions, the validation process must determine which area of memory is to be accessed and if the contents of that memory might include instructions. For a pseudo-Harvard architecture in which access to instruction memory may be enabled, the state of the computer system, memory, and/or untrusted instructions must be considered.

Details of the virtual environment 110 may vary depending on the physical computer 100. For example, for a physical computer 100 with a processor 106 that uses the x86-32 instruction set, the virtual environment 110 may modify the memory regions described by the code segment selector, data segment selector, and other data-handling segment selectors such that the code segment selector does not overlap with any other segments. For x86-64, two base registers (e.g., r14 for code and r15 for data) may be sequestered.

Additionally or alternatively, in an x86-64 system, the virtual environment 110 may sequester a single base address register. In this configuration, the virtual environment may randomize or zero-base either the code or data memory address. For example, the virtual environment may randomize the code addresses and zero-base the data addresses. In an example using ARM, the virtual environment may sequester r8 as a base address for code and add it to the addresses visible to the running untrusted module 116 prior to transferring control in a scratch register. In this example, the virtual environment 110 may require the scratch register to be cleared at the prolog for the basic block.

Figure 2:
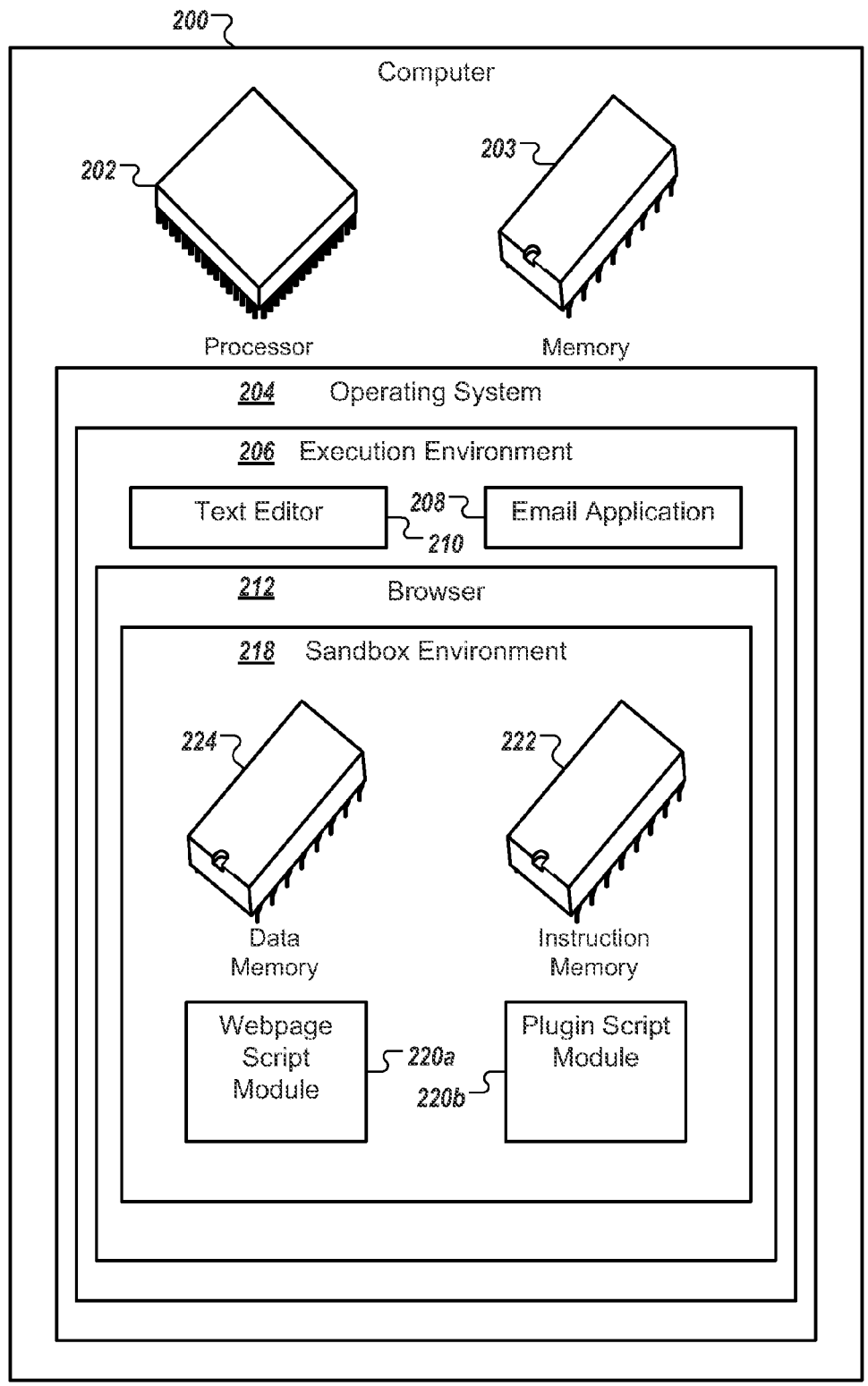
FIG. 2 is a diagram of an example computer system containing a browser with a native environment.

FIG. 2 is a diagram of an example computer system 200 containing a browser with a virtual native environment. The computer system 200 may be used for, for example, downloading and displaying a webpage with an untrusted module.

The computer system 200 includes hardware components including, but not limited to, a processor 202 and a memory 203. The processor 202 can be configured to carry out instructions of computer programs and to perform arithmetic, logical, and input/output operations of the computer system 200. The memory 203 can be configured to store software instructions and data for the computer system 200. Other hardware components that may be included in the computer system 200 include, but are not limited to, disk memory, input/output hardware, and network connections (not shown for clarity). The hardware of the computer system 200 runs an operating system 204 that manages computer hardware resources and provides common services for application software. The operating system 204 may be a general purpose operating system that is compatible across a variety of hardware configurations, or the operating system 204 may be system-specific. Some of the tasks that the operating system 204 may be responsible for include, but are not limited to, user authentication, windowing, and managing network traffic.

The operating system 204 can create an execution environment 206 for executing one or more applications. The execution environment 206 can represent the conditions, policies, and tools that the operating system 204 provides to applications executing in the operating system 204. Although one execution environment 206 is shown, some computer systems 200 can create multiple execution environments 206. For example, a computer system 200 may have many users, and the computer system 200 can create an execution environment for each user. The execution environments 206 may not all be the same. For example, an execution environment 206 for an administrative user may have more permissions enabled than an execution environment 206 for a non-administrative user.

Applications that can execute in the execution environment 206 can include user-facing applications, for example, an email application 208, a text editor 210, and a browser 212. Other types of application that are not user-facing, e.g., utilities daemons, may also execute in the execution environment 206. The applications in the execution environment 206 can execute computer-specific commands. Computer-specific commands include any function, library, API, or other command that is compatible with the computer system 200, but that may not be compatible with other computer systems.

One type of computer-specific command is a processor-specific command. Processor-specific commands are commands that are associated with one or more processors. Often, the processor-specific commands are part of an instruction set associated with a processor architecture, though not always. One group of processor-specific instructions is the x86 family of instruction sets. Example processor-specific instruction in the x86 family of instruction sets include AND for a logical "and", CBW for converting a byte to a word, STI for setting an interrupt flag, and SUB for subtraction. Other example processor instruction sets include the ARM instruction set and the PowerPC instruction set.

Another type of computer-specific command is an operating system-specific command. Operating system-specific commands are commands that are associated with one or more operating systems. Operating system-specific commands are often organized into APIs related to a particular concept or task. For example, some Unix-based operating systems include an API for sockets and another API for shared memory management. Other operating system-specific commands include files and features often or always found in an operating system. For example, the/dev/random file in some Unix-based operating systems servers as a pseudorandom number generator.

Other types of computer-specific commands can exist. For example, a hardware device connected to the computer system 200 may have associated commands. The complete set of all computer-specific commands available in the execution environment can include processor-specific commands, operating system-specific commands, and other commands. The number and type of processor-specific commands may depend on the configuration of the computer system 200, as well as other factors.

A shown in FIG. 2, the browser 212 executes in the execution environment 206 and may access some or all of the computer-specific commands of the execution environment 206. The browser 212 can load and display documents, e.g., files or other data, to a user. In doing so, the browser 212 may need to render, interpret, and/or execute portions of the documents. Examples of the browser 212 include, but are not limited to, file browsers, document editors, and web-browsers.

The browser 212 can also create a sandbox environment 218 for executing received software modules 220. The software modules 220 may come from a variety of sources. For example, software module 220a may be component of a document being loaded and displayed by the browser 212 and software module 220b may be a plugin of the browser 212. Software module may be either configured to execute computer-specific instructions and/or sandbox-specific instruction.

The instructions of the software modules 220 may be stored in an instruction memory 222 in the sandbox environment. The instruction memory 222 and a data memory 224 may be virtual representations of the memory 203. For example, the sandbox environment 218 may map accesses to the instruction memory 222 and the data memory 224 to the memory 203 according to, for example, a processor or instruction set specific scheme or any other appropriate scheme. Example schemes for the x86-32, x86-64, and ARM instruction set have been described previously, but other schemes are possible. In any case, the software modules 220 may be given permission by the sandbox environment 218 to access the data memory 224, but not the instruction memory 222.

Figure 3:
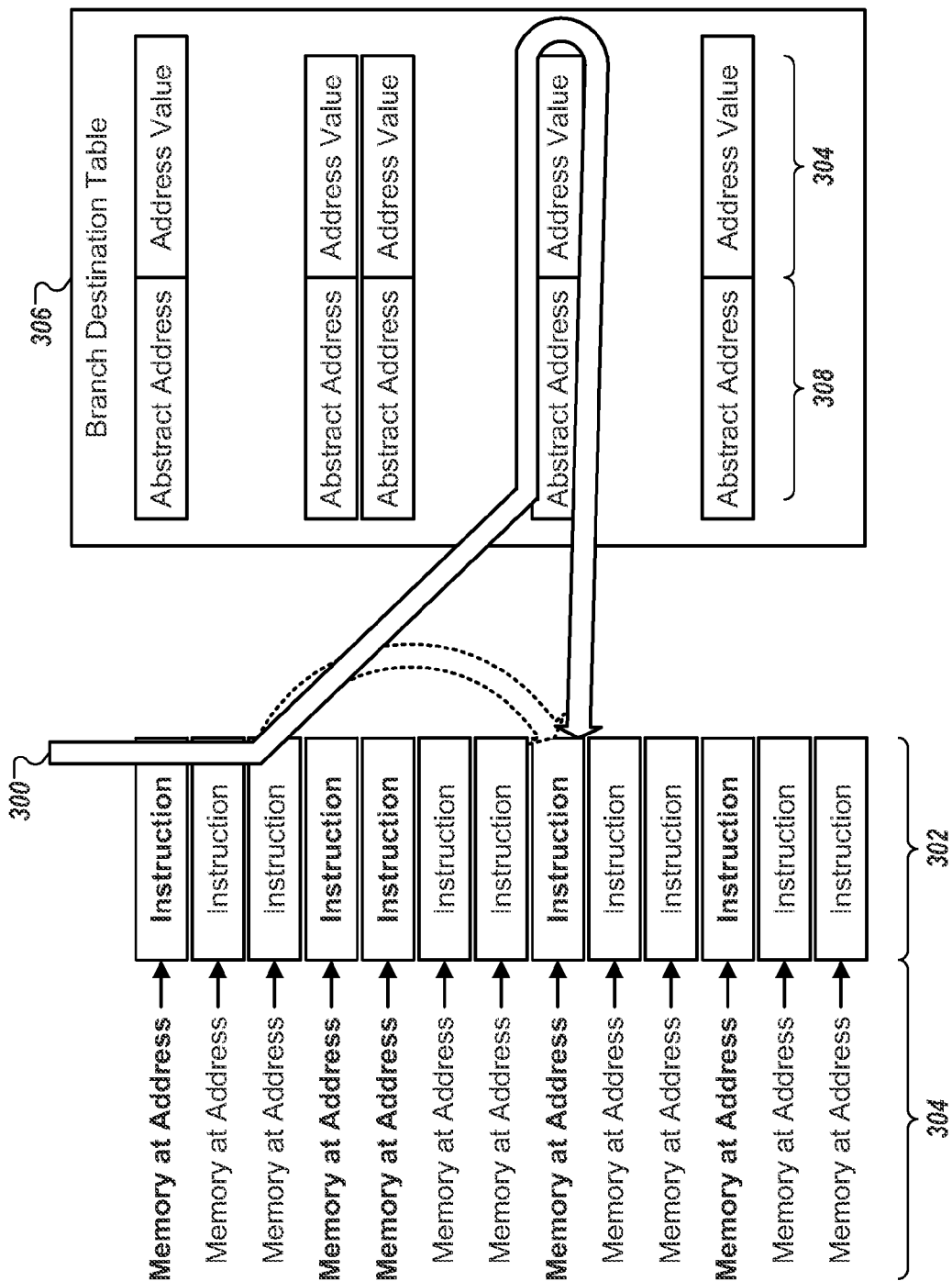
FIG. 3 is a diagram that schematically shows an example control flow of a running program.

FIG. 3 is a diagram that schematically shows an example control flow 300 of a running program. The control flow 300 shows the sequence of instructions 302 of running programs that are executed, for example under the supervision of a sandboxing environment with the von Neumann architecture. Each instruction 302 has an associated address 304 that may be, for example, a physical memory address at which the instruction is stored in physical random access memory (RAM). Similarly, some instructions 302 may have associated an associated abstract address 308 at which the instruction is stored in a virtual instruction memory of the sandbox environment.

The instructions 302 and address 304 that may be the target of indirect branching are illustrated in FIG. 3 using boldface type. That is, the bold instructions 304 are those instructions that may be branched to by another instruction. In this example, it is possible that, due to the values of runtime data, the flow control 300 may branch to a different bolded instruction 304 than the one shown.

Each such instruction 302 has a matching entry in a branch destination table 306. The branch destination table 306 maps addresses 304 to abstract addresses 308. Branch destination table 306 may have been created, for example, by a compiler toolchain or code analysis engine prior to the running of the program. The sandbox environment may be configured to only provide the abstract addresses 308, and not addresses 304, to the running program. Although every instruction 302 that may be the target of indirect branching has a matching entry in the branch destination table 306 in this example, this may not be required in other examples. For example, only instructions that are at the start of a basic block may have a matching entry in a different branch destination table.

The control flow 300 enters the program, in this case at the main entry point (e.g., the main( ) function in c code), and proceeds to step through the instructions 302 sequentially until an instruction requiring a memory address is reached. For example, the instruction may include a call to a static function pointer generated by the linker that linked the program. Instead of gaining direct access to the address 304 stored in the pointer as shown by the dotted arrow, the sandbox environment can provide the program with the associated abstract address 308. A call by the program to the abstract address 308 location may be intercepted by sandbox environment and modified with the address 304, and the control flow 300 can then proceed to the instruction 302 of the address 304.

Attempts by an instruction 302 to access the contents of another instruction 302, as opposed to passing control flow to another instruction 302, may be prevented based on the configuration of the computer system running the control flow 300. For example, the computer system may only permit lookups in the branch destination table 306 by the sandbox and only for passing control flow. Additionally or alternatively, the instructions 302 may be validated when loaded or run in the sandbox environment. When this validation is performed, any instruction that attempts to look up an address value 304 from an abstract address 308 may be rejected by the sandbox.

Figure 4:
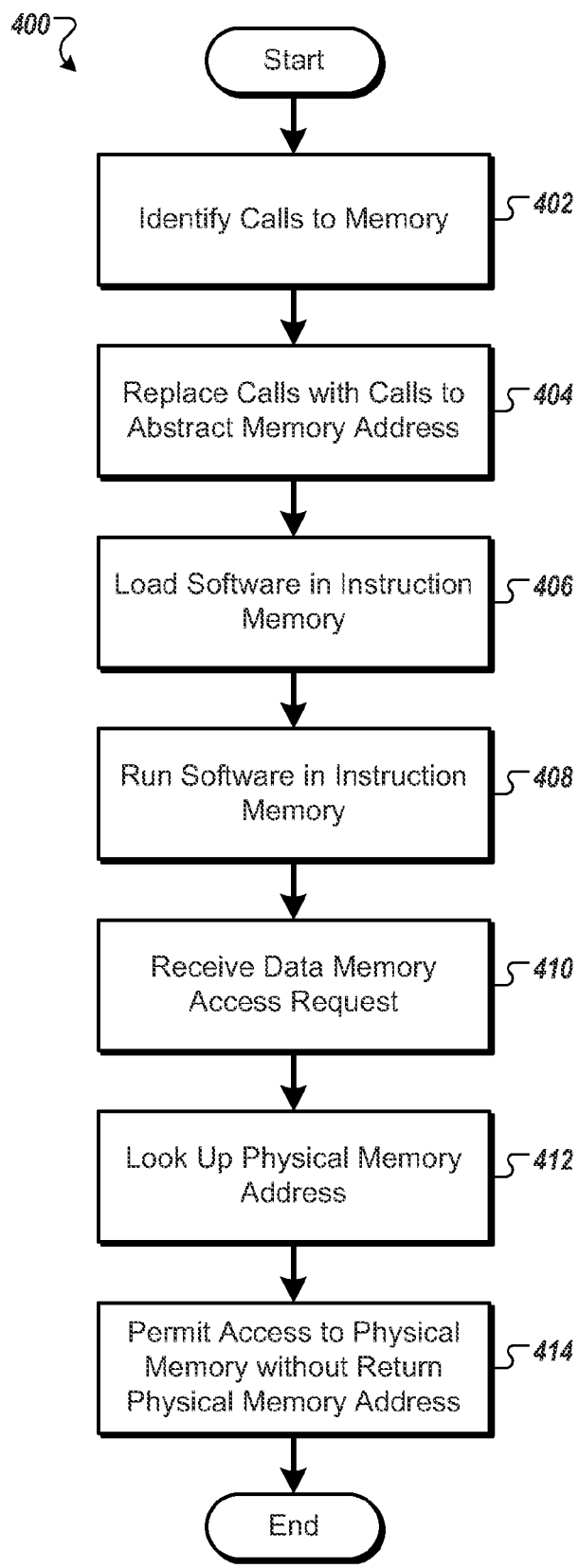
FIG. 4 is a flowchart of an example process for handling a memory request.

FIG. 4 is a flowchart of an example process 400 for handling a memory request. For convenience and clarity, the process 400 will be described as being performed by a system including one or more computing devices, for example the computer system 200. Therefore, the description that follows uses a sandbox environment, e.g., sandbox environment 218, as the basis of an example describing the system for clarity of presentation. However, another system, or combination of systems, can be used to perform the process 400.

The system identifies, in software, calls to memory. (402). For example, the sandbox environment can receive one or more software modules, e.g., the software modules 220, to be loaded and run within the software environment. Receiving the software modules can include a user loading a web-page that activates a plug-in of a browser, or a user double clicking an interpreted language software package that runs in the sandbox environment.

As one element of validating the software, the sandbox environment can analyze the software to determine if any of the instructions of the software access the memory of the computer, e.g., the memory 203 or if any of the instruction of the software access the instruction memory of the virtual computer, e.g., the instruction memory 222. As another element of validating the software, the sandbox environment may check that the software includes a branch destination table and that the instructions of the software use the branch destination table. For example, the sandbox environment may check the instructions of the software to determine if the instructions exclusively use the branch destination table to make indirect control flow transfers.

If the software does contain instructions to access the memory of the computer, the instructions can be replaced with instruction to access data memory (404). For example, the software environment may use abstract memory addresses from the branch destination table to replace addresses in instructions to access the memory.

The system loads the software into instruction memory (406). For example, the sandbox environment can load the instructions of the software into instruction memory. If the software includes a branch destination table, the branch destination table may also be loaded into instruction memory. Non-running data of the software may be loaded into the data memory. Non-running data can include, for example, user settings or data objects e.g., image files.

The system runs the software in the instruction memory (408). For example, the sandbox or another system may interpret the instructions if they are in an interpreted language, or a processor (e.g. the processor 202) can execute the instructions of the software is the software was compiled from an executable language (e.g., C or C++).

The system receives a data memory access request (410). For example, a software instruction may include an access request to a memory location in the data memory. The format of the data memory request may depend on the scheme for mapping abstract addresses to physical memory addresses as described above. The system looks up the physical memory address (412). For example, if a memory address is the least significant n bits of an m bit physical memory address, the sandbox environment may append the n bits of the request to a stored m-n length prefix to create a reference to a memory address within the range defined by the m-n length prefix. In another example, the sandbox environment may store a table that translates memory addresses to physical memory address, and may look up the physical memory address that matches the memory address in the request.

Access to the physical memory is permitted without providing the physical memory address (414). For example, for a read request, the contents of the data memory may be provided to the software application in response to a read request. If the request from the software is, for example, a write request, the sandbox environment may permit access to the physical memory without returning the physical memory address by receiving the data to be stored and storing it on behalf of the software.

Although a particular number and type of steps are described, more, fewer, and/or different steps may be performed. For example, before looking up a physical memory address (412), the sandbox environment may determine that the memory access request is for data memory and not instruction memory. In another example, the sandbox environment may skip the software validation (402) for some software (e.g. for software signed by a known publisher) and/or the software validation (402) may be performed as part of a larger software validation by the sandbox environment.

Figure 5:
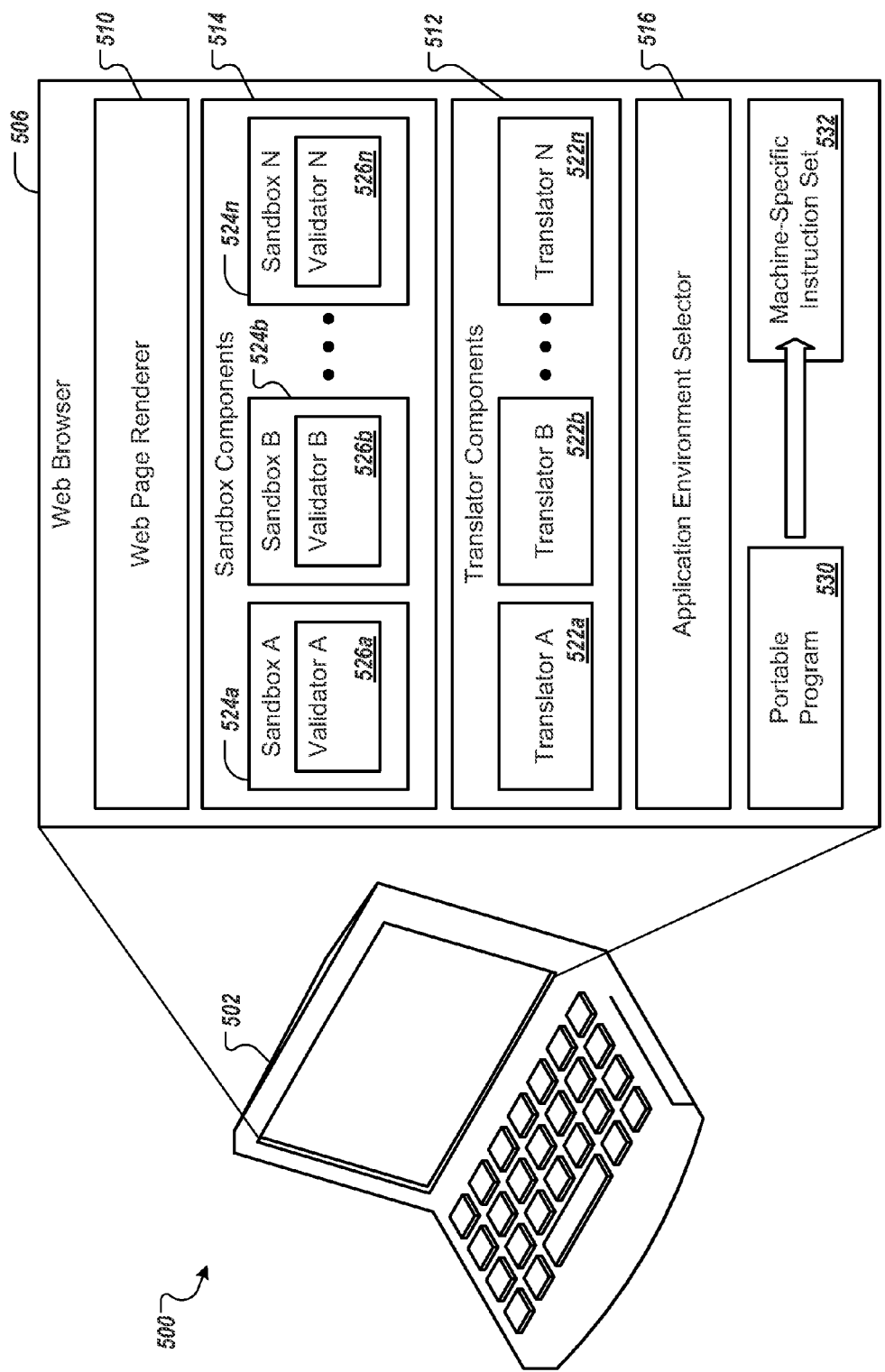
FIG. 5 is a schematic illustration of an example application environment

FIG. 5 is a schematic illustration of an example application environment 500 included on a computer device, e.g. the computer device 200. The client device 502 can run a web browser 506. The web browser 506 in the present example can include a web page renderer 510, one or more translator components 512, one or more sandbox components 514, and an application environment selector 516. Each of the one or more sandbox components 514 include a corresponding validator component. The web page renderer 510, the application environment selector 516, and each of the components 512 and 514, for example, may include software components (e.g., modules, objects, libraries, services, etc.) configured to execute on one or more processors associated with the client device 502.

The web page renderer 510, for example, can render web pages received by the web browser 506. A web page, for example, may include HTML script and style sheets which may be parsed by the web page renderer 510, and may include links to web resources (e.g., images, scripts, program code, etc.) referenced by the page. When rendering the web page, for example, the web page renderer 510 can combine the various resources included in the page, for presentation to a user as a cohesive unit.

The translator components 512 may include one or more translators for translating a program in a portable format to a machine-specific instruction set. In the present example, the translator components 512 include a translator 522a (Translator A), 522b (Translator B), and 522n (Translator N). Each of the translators 522a, 522b, and 522n, for example, can include software for transforming program code of a neutral, portable format to an instruction-specific format for execution on the client device 502, based on the device's hardware configuration (e.g., client device model, type of microprocessor, type and/or amount of memory, type and/or speed of network connection, etc.) and operating system. In general, each of the translators 522a, 522b, and 522n may be associated with a different sandbox and validator. However, in some implementations, a single translator may transform program code for multiple sandboxes. Moreover, in some implementations, a translator may be associated with a null-sandbox, e.g., a no alignment null-sandbox for a host with robust OS-based security sandboxing.

The sandbox components 514 may include one more sandboxes for executing programs translated to a machine-specific instruction set using software-based fault isolation. In the present example, the sandbox components 514 include a sandbox 524a (Sandbox A), 524b (Sandbox B), and 524n (Sandbox N). Each of the sandboxes 524a, 524b, and 524n, for example, can include a set of software fault isolation rules for the execution of code on the client device 502, based on the device's hardware configuration and operating system. In implementations in which a web browser may select from multiple different application environments, each environment may offer different features or advantages relative to other environments. For example, Sandbox A may offer improved security, whereas Sandbox B may offer faster performance and/or translation time.

Each of the sandbox components 514 may be associated with a respective validator component. In the present example, Sandbox A is associated with a validator 526a (Validator A), Sandbox B is associated with a validator 526b (Validator B), and Sandbox N is associated with a validator 526n (Validator N). Each of the validators 526a, 526b, and 526n, for example, can determine whether a program may be reliably modified by a translator and can evaluate an application binary to determine whether a sandbox's set of rules are followed. In general, validators may be part of a sandbox implementation for sandboxes that use SFI.

Validators, for example, may address reliable disassembly, data integrity (i.e., no loads or stores outside of a data sandbox), instruction safety, and control flow integrity (i.e., ensuring that a program follows a predetermined flow). By ensuring that a translator produces machine code that can be reliably disassembled, for example, a validator can ensure that the security properties of a sandbox are followed, e.g., the restriction of return instructions and system calls, and the sandboxing of memory references and control flow address targets. Sandbox designs that do not use disassembly, for example, may use other mechanisms to intercept potentially unsafe operations.

In general, translators and sandboxes (with their respective validators) may be paired, and may be deployed together by an application environment provisioning system. If a translator generates code that does not follow the rules of its associated sandbox, for example, the sandbox may not execute the program, as the program code may include unsafe instructions. Thus, a translator is generally configured to transform a program for execution by a particular sandbox. Validators and translators are generally separated, facilitating the development of each component by different parties. For example, if a hardware vendor were to ship a microprocessor with a defect that could potentially cause a sandbox to be vulnerable, the vendor could modify a translator to not generate a faulty instruction, while developers of the application environment could modify the corresponding sandbox and validator to not accept the faulty instruction. Thus, in some implementations, sandboxes (and validators) may maintain the overall security of a client device in case of a faulty hardware component or translator.

The application environment selector 516 can select between multiple available application environments, based at least in part on a hardware configuration of a client device. For example, when receiving a portable program 530, the web browser 506 can use the application environment selector 516 to examine the program and to identify a translation scheme and sandbox combination suitable for the program and for the client device 502. After a suitable application environment has been selected, for example, the web browser 506 can select and use one of the translator components 512 to translate the portable program 530 to a machine-specific instruction set 532 for the client device 502, and can use a corresponding one of the sandbox components 514 (and an associated validator) to execute the translated program using software-based fault isolation.

Each sandbox 524 may have a virtual data memory (e.g. the data memory 224) and a virtual instruction memory (e.g., the instruction memory 222) for storing data and instructions, respectively. The validators 526 may be configured to verify that the machine-specific instruction set 532 does not contain instructions that attempt to read instruction memory. If instructions to read instruction memory are located, the validators 526 may reject the portable program 530, e.g., rejected software 404 of FIG. 4. If the machine-specific instruction set 532 is validated and does not contain any instructions that attempt to read instruction memory, the machine-specific instruction set 532 may be accepted, e.g., loaded software 406 of FIG. 4.

By using differentiated data and instruction memory, as opposed to, for example, a single memory for storing both data and instructions, and by preventing the instruction memory from being read by software running in a sandbox 524, a number of security advantages may be realized.

For example, having separate code and data address spaces may make it difficult for the machine-specific instruction set 532 to determine, e.g., by inspection, whether the machine-specific instruction set 532 might be useful for an attack, e.g., as a return-oriented programming gadget, or that contains immediate values usable instructions when fetched in a de-registered manner. Being unable to read instructions may increase the difficulty for machine-specific instruction set 532 to be used, for example, as a stepping stone in a systematic attack.

Figure 6:
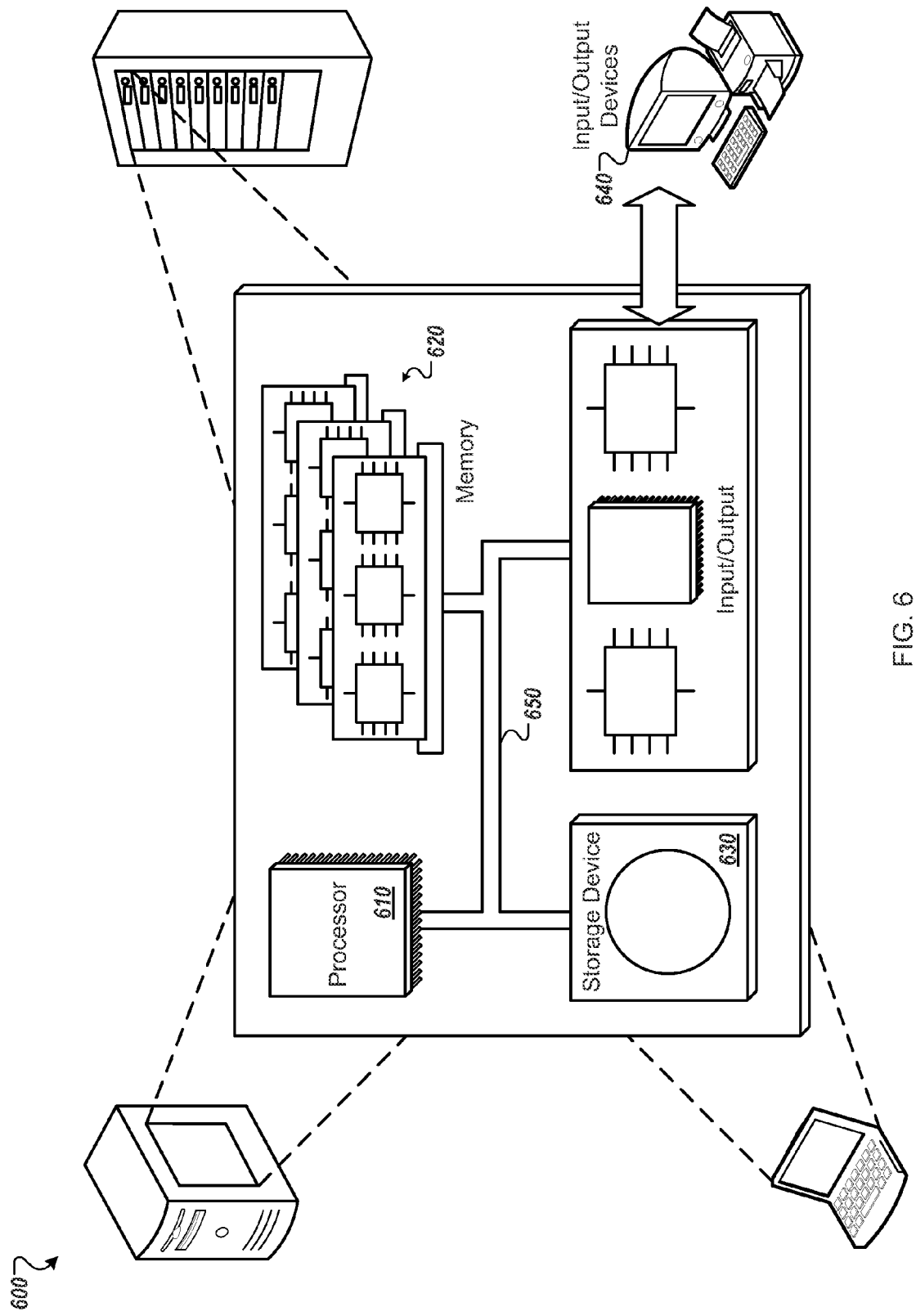
FIG. 6 is a schematic diagram that shows an example of a computing system.

FIG. 6 is a schematic diagram that shows an example of a computing system 600. The computing system 600 can be used for some or all of the operations described previously, according to some implementations. The computing system 600 includes a processor 610, a memory 620, a storage device 630, and an input/output device 640. Each of the processor 610, the memory 620, the storage device 630, and the input/output device 640 are interconnected using a system bus 650. The processor 610 is capable of processing instructions for execution within the computing system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the computing system 600. In some implementations, the memory 620 is a computer-readable medium. In some implementations, the memory 620 is a volatile memory unit. In some implementations, the memory 620 is a non-volatile memory unit.

The storage device 630 is capable of providing mass storage for the computing system 600. In some implementations, the storage device 630 is a computer-readable medium. In various different implementations, the storage device 630 may be a floppy disk device, a hard disk device, an optical disk device, or a tape device.

The input/output device 640 provides input/output operations for the computing system 600. In some implementations, the input/output device 640 includes a keyboard and/or pointing device. In some implementations, the input/output device 640 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A method comprising:
executing a virtual environment on a computer that provides a single type of memory for storing both data and instructions of software modules, wherein the virtual environment provides separate types of memory for storing data and instructions of software modules, the separate types of memory including:
   (i) a data memory in which the virtual environment prevents content stored in the data memory from being executed, and
   (ii) an instruction memory in which the virtual environment prevents content stored in the instruction memory from being read by instructions stored in the instruction memory;
receiving, at the virtual environment, a first software module that includes a plurality of instructions;
performing validation of the first software module, including:
   (i) identifying, in the first software module, one or more calls to the single type of memory of the computer, and
   (ii) verifying that the one or more calls to the single type of memory are calls to the data memory of the virtual environment, including replacing at least one of the one or more calls to the single type of memory with at least one call to the data memory of the virtual environment to prevent a return-oriented programming attack;
loading the first software module into the instruction memory in response to validating the first software module; and
running the first software module in the virtual environment.

2. The method of claim 1, wherein the computer conforms to a von Neumann style architecture and wherein the virtual environment conforms to a Harvard style architecture.

3. The method of claim 1, wherein identifying, in the first software module, the one or more calls to the single type of memory of the computer comprises identifying every call to the single type of memory; and
wherein verifying that the one or more calls to the single type of memory are calls to the data memory comprises verifying that every call to the single type of memory is a call to the data memory.

4. The method of claim 1, further comprising: converting, after receiving the first software module and before performing validation of the first software module, the first software module into a second representation of the first software module; and
wherein performing validation of the first software module comprises examining the second representation of the first software module to determine that one of the first software module's instructions is configured to attempt to read the single type of memory.

5. The method of claim 1, wherein the instruction memory is addressed with memory addresses and corresponding abstract addresses; and
wherein replacing at least one of the one or more calls to the single type of memory with at least one call to the data memory of the virtual environment comprises replacing, in the at least one of the one or more calls to the single type of memory, addresses of the single type of memory with abstract addresses of the data memory.

6. The method of claim 5, wherein the abstract addresses are randomized resulting in an obfuscation of the length of code stored in the instruction memory.

7. A non-transitory computer storage medium encoded with a computer program, the program comprising instructions that when executed by one or more processors cause the one or more processors to perform a method comprising:
executing a virtual environment on a computer that provides a single type of memory for storing both data and instructions of software modules, wherein the virtual environment provides separate types of memory for storing data and instructions of software modules, the separate types of memory including:
   (i) a data memory in which the virtual environment prevents content stored in the data memory from being executed, and
   (ii) an instruction memory in which the virtual environment prevents content stored in the instruction memory from being read by instructions stored in the instruction memory;
receiving, at the virtual environment, a first software module that includes a plurality of instructions;
performing validation of the first software module, including:
   (i) identifying, in the first software module, one or more calls to the single type of memory of the computer, and
   (ii) verifying that the one or more calls to the single type of memory are calls to the data memory of the virtual environment, including replacing at least one of the one or more calls to the single type of memory with at least one call to the data memory of the virtual environment to prevent a return-oriented programming attack;
loading the first software module into the instruction memory in response to validating the first software module; and
running the first software module in the virtual environment.

8. The computer storage medium of claim 7, wherein the computer conforms to a von Neumann style architecture and wherein the virtual environment conforms to a Harvard style architecture.

9. The computer storage medium of claim 7, wherein identifying, in the first software module, the one or more calls to the single type of memory of the computer comprises identifying every call to the single type of memory; and
wherein verifying that the one or more calls to the single type of memory are calls to the data memory comprises verifying that every call to the single type of memory is a call to the data memory.

10. The computer storage medium of claim 7, the method further comprising: converting, after receiving the first software module and before performing validation of the first software module, the first software module into a second representation of the first software module; and wherein performing validation of the first software module comprises examining the second representation of the first software module to determine that one of the first software module's instructions is configured to attempt to read the single type of memory.

11. The computer storage medium of claim 7, wherein the instruction memory is addressed with memory addresses and corresponding abstract addresses; and
   wherein replacing at least one of the one or more calls to the single type of memory with at least one call to the data memory of the virtual environment comprises replacing, in the at least one of the one or more calls to the single type of memory, addresses of the single type of memory with abstract addresses of the data memory.

12. A computing system comprising:
   one or more processors; and
   a single type of memory for storing both data and instructions of software modules, the single type of memory being encoded with instructions that, when executed by the one or more processors, cause performance of operations comprising:
   executing a virtual environment on the computing system, wherein the virtual environment provides separate types of memory for storing data and instructions of software modules, the separate types of memory including:
      (i) a data memory in which the virtual environment prevents content stored in the data memory from being executed, and
      (ii) an instruction memory in which the virtual environment prevents content stored in the instruction memory from being read by instructions stored in the instruction memory;
   receiving, at the virtual environment, a first software module that includes a plurality of instructions;
   performing validation of the first software module, including:
      (i) identifying, in the first software module, one or more calls to the single type of memory of the computing system, and
      (ii) verifying that the one or more calls to the single type of memory are calls to-the data memory of the virtual environment, including replacing at least one of the one or more calls to the single type of memory with at least one call to the data memory of the virtual environment to prevent a return-oriented programming attack;
   loading the first software module into the instruction memory in response to validating the first software module; and
   running the first software module in the virtual environment.

13. The computing system of claim 12, wherein the computing system conforms to a von Neumann style architecture and wherein the virtual environment conforms to a Harvard style architecture.

14. The computing system of claim 12, wherein identifying, in the first software module, the one or more calls to the single type of memory of the computing system comprises identifying every call to the single type of memory; and
   wherein verifying that the one or more calls to the single type of memory are calls to the data memory comprises verifying that every call to the single type of memory is a call to the data memory.

15. The computing system of claim 12, wherein the operations further comprise: converting, after receiving the first software module and before performing validation of the first software module, the first software module into a second representation of the first software module; and
   wherein performing validation of the first software module comprises examining the second representation of the first software module to determine that one of the first software module's instructions is configured to attempt to read the single type of memory.

16. The computing system of claim 12, wherein the instruction memory is addressed with memory addresses and corresponding abstract addresses; and
   wherein replacing at least one of the one or more calls to the single type of memory with at least one call to the data memory of the virtual environment comprises replacing, in the at least one of the one or more calls to the single type of memory, addresses of the single type of memory with abstract addresses of the data memory.

17. The computing system of claim 16, wherein the abstract addresses are randomized resulting in an obfuscation of the length of code stored in the instruction memory.

* * * * *